US010556417B2

(12) United States Patent
Biskop et al.

(10) Patent No.: US 10,556,417 B2
(45) Date of Patent: Feb. 11, 2020

(54) METHOD FOR PRINTING A THREE-DIMENSIONAL STRUCTURE, METHOD FOR CONTROLLING A PRINT HEAD AND A PRINTED ARTICLE

(71) Applicant: LUXEXCEL HOLDING B.V., Goes (NL)

(72) Inventors: Joris Biskop, Vlissingen (NL); Richard Van De Vrie, Wolphaartsdijk (NL)

(73) Assignee: LUXEXCEL HOLDING B.V., Eindhoven (NL)

( * ) Notice: Subject to any disclaimer, the term of this patent is extended or adjusted under 35 U.S.C. 154(b) by 1137 days.

(21) Appl. No.: 14/398,561

(22) PCT Filed: Apr. 29, 2013

(86) PCT No.: PCT/EP2013/058907
§ 371 (c)(1),
(2) Date: Nov. 3, 2014

(87) PCT Pub. No.: WO2013/167415
PCT Pub. Date: Nov. 14, 2013

(65) Prior Publication Data
US 2015/0093552 A1    Apr. 2, 2015

(30) Foreign Application Priority Data
May 7, 2012    (EP) .................................. 12003601

(51) Int. Cl.
*B33Y 10/00*    (2015.01)
*B33Y 50/02*    (2015.01)
(Continued)

(52) U.S. Cl.
CPC .......... *B33Y 10/00* (2014.12); *B29K 2101/00* (2013.01); *B29K 2105/0058* (2013.01);
(Continued)

(58) Field of Classification Search
CPC ...................................................... B33Y 10/00
See application file for complete search history.

(56) References Cited

U.S. PATENT DOCUMENTS 7,497,977 B2    3/2009    Nielsen et al.
2002/0171177 A1    11/2002    Kritchman et al.
(Continued)

FOREIGN PATENT DOCUMENTS

CN    101561674 A    10/2009
EP    2199065 A1    6/2010
(Continued)

OTHER PUBLICATIONS

International Preliminary Report on Patentability, Application No. PCT/EP2013/058907 dated Sep. 5, 2014.
(Continued)

*Primary Examiner* — Larry W Thrower
(74) *Attorney, Agent, or Firm* — The Dobrusin Law Firm, P.C.

(57) ABSTRACT

The present invention relates to a method for printing a three-dimensional structure comprising the steps of providing structural parameters defining the shape of the three-dimensional structure in a first step, converting the structural parameters into an intensity image having multiple pixels which are arranged in a two-dimensional pattern and which comprises at least different intensities in a second step and controlling the print head in dependency of the intensity image in order to print the three-dimensional structure in a third step, wherein the print head moves to a certain position and deposits at least one droplet of printing material when processing a certain pixel and wherein the number of droplets and/or the amount of printing material deposited at the certain position by the print head is chosen in dependency of the intensity of the corresponding pixel.

17 Claims, 2 Drawing Sheets

(51) Int. Cl.
  *B33Y 80/00* (2015.01)
  *B29K 101/00* (2006.01)
  *B29K 105/00* (2006.01)

(52) U.S. Cl.
  CPC .............. *B33Y 50/02* (2014.12); *B33Y 80/00* (2014.12); *Y10T 428/24851* (2015.01)

(56) References Cited

U.S. PATENT DOCUMENTS

| | | |
|---|---|---|
| 2005/0025905 A1 | 2/2005 | Pan |
| 2005/0248065 A1 | 11/2005 | Owada |
| 2009/0244230 A1 | 10/2009 | Ohnishi et al. |
| 2010/0195122 A1 | 8/2010 | Kritchman |
| 2010/0221504 A1* | 9/2010 | Bauer ................ B29C 67/0059 428/195.1 |
| 2013/0286073 A1 | 10/2013 | Blessing |

FOREIGN PATENT DOCUMENTS

| | | |
|---|---|---|
| EP | 2412767 A1 | 2/2012 |
| EP | 2447045 A2 | 5/2012 |
| EP | 2474404 A1 | 7/2012 |
| EP | 2396682 B1 | 5/2013 |
| FR | 2948175 A1 | 1/2011 |
| WO | 2006/029268 A2 | 3/2006 |
| WO | 2009/120394 A2 | 10/2009 |
| WO | 2010/091888 A1 | 8/2010 |
| WO | 2011/011818 A1 | 2/2011 |
| WO | 2013/167528 A1 | 5/2013 |

OTHER PUBLICATIONS

International Search Report, Application No. PCT/EP2013/058907 dated Jul. 2, 2013.

Potential related U.S. Appl. No. 14/398,550, filed Nov. 3, 2014, published as WO2013/167528.

Chinese Office Action dated Dec. 4, 2015; Application No. 201380023608.X.

* cited by examiner

METHOD FOR PRINTING A THREE-DIMENSIONAL STRUCTURE, METHOD FOR CONTROLLING A PRINT HEAD AND A PRINTED ARTICLE

BACKGROUND

The present invention relates to a method for three-dimensional structures. Suchlike printing methods are commonly known. For example, the international patent application WO 2010/091 888 A1 discloses a method for printing light-directing structure onto a substrate, wherein the light-directing structure is built up from a plurality of droplets of a substantially transparent material, which are printed e.g. by means of an inkjet printer one above the other and side by side onto substrate.

The print head has to be controlled by a computer program for printing suchlike structures. Known computer programs and printer controller are focused on printing only two-dimensional pictures.

SUMMARY

It is therefore an object of the present invention to provide a method for printing three-dimensional structures, wherein the shape of the three-dimensional structure to be printed is defined by data packets which can be processed comparatively simple and efficient and which can be used to control the print head in an comparatively simple and efficient way. Furthermore, the data packet should be as small as possible to limit the overall data volume which has be processed.

The object of the present invention is achieved with a method for printing a three-dimensional structures comprising the steps of providing structural parameters defining the shape of the three-dimensional structure in a first step, converting the structural parameters into an intensity image having multiple pixels which are arranged in a two-dimensional pattern and which comprises at least different intensities in a second step and controlling the print head in dependency of the intensity image in order to print the three-dimensional structure in a third step, wherein the print head moves to a certain position and deposits at least one droplet of printing material when processing a certain pixel and wherein the number of droplets and/or the amount of printing material deposited at the certain position by the print head is chosen in dependency of the intensity of the corresponding pixel.

It is herewith possible to describe the shape of the three-dimensional structure which has to be printed with two-dimensional data by using the intensity image. An advantage of the method is that an intensity image can be processed comparatively simple and efficient. Furthermore, the amount of data is reduced compared to e.g. CAD data, so that the communication with the print head can be optimized and particularly accelerated. This leads to a reduced overall printing time, so that the manufacturing costs for printing three-dimensional structures decreases. The printing material comprises preferably a printing ink, e.g. a transparent or translucent printing ink for printing an article with light directing structures, like lenses (convex, concave or Fresnel lenses), prisms or light conductors, or a colored printing ink for printing almost any solid article. Preferably, the printing ink comprises an UV curable liquid monomer becoming a polymer if being cured. Preferably, the droplets are printed onto a substrate. The substrate can be a part of the printed article or a support plate for supporting the deposited droplets only during the printing process.

According to a preferred embodiment of the present invention, the structural parameters are converted into a colored intensity image having multiple pixels which comprises different colors in the second step and wherein the print head is controlled in dependency of the colored intensity image in order to print the three-dimensional structure in a third step, wherein the type of printing material deposited at the certain position by the print head is chosen in dependency of the color of the corresponding pixel. This approach allows to include information about the printing material for each pixel into the intensity image. It is therefore possible to build up three-dimensional structures made of different printing materials and to communicate with the print head in a comparatively efficient way. The print head preferably comprises several print ink containers each filled up with a certain printing material.

According to a preferred embodiment of the present invention, the structural parameters are provided as CAD-data in the first step, so that the method according to the present invention is compatible with common CAD software. The print head can directly connect to a suchlike software, if the present method is used as the interface between the CAD software and the print head.

According to a preferred embodiment of the present invention, the structural parameters are converted into the colored intensity image in the second step in such a manner that each pixel represents a certain position in an orthogonal projection of the three-dimensional structure, wherein the color of each pixel represents optical and/or visual characteristics of the three-dimensional structure at this position, wherein the intensity of each pixel represents the height of the three-dimensional structure at this position. In this embodiment, the color data contains information about the optical and/or visual characteristics of the three-dimensional structure. This approach allows to build up three-dimensional structures in the form of light-directing structures. The printing ink comprises e.g. a transparent or translucent monomer or polymer, wherein the three-dimensional structure forms e.g. a lens (convex, concave or Fresnel lenses), a prism, a light conductor or the like.

According to a preferred embodiment of the present invention, the structural parameters are converted into the colored intensity image in the second step in such a manner that a certain color of a pixel represents UV light to be used for curing the droplets deposited at the corresponding position, wherein the print head deposits droplets of printing material at a certain position in the third step and wherein a light source cures the deposited droplet when the corresponding pixel comprises a color representing UV light emitted by the light source. It is herewith possible to integrate curing information for a curing device, e.g. a UV LED (light emitting diode), of the print head into the intensity image. Preferably, the color represents a certain wavelength spectrum of the UV light and the light source cures the deposited droplet with light of a certain wavelength spectrum when the corresponding pixel comprises a color representing this wavelength spectrum. It is also conceivable that the curing time for each droplet is selected in dependency of the color of the corresponding pixel.

According to a preferred embodiment of the present invention, the structural parameters are converted into the colored intensity image in the second step in such a manner that another certain color of a pixel represents a finishing material, wherein the method comprises a fourth step, in which the print head deposits droplets of the finishing material at a certain position onto the three-dimensional structure printed in the third step when the corresponding pixel comprises a color representing the finishing layer. It is herewith advantageously possible to integrate information for post processing steps into the colored intensity image, so that the print head can be controlled by the colored intensity image also for post processing steps.

According to a preferred embodiment of the present invention, wherein the structural parameters are converted into the colored intensity image in the second step in such a manner that a certain color of a pixel represents a support material for providing overhanging areas in the three-dimensional structure, wherein the print head deposits droplets of the support material at a certain position in the third step when the corresponding pixel comprises a color representing the support material layer, wherein the method comprises a fifth step, in which the deposited support material is removed to generate the overhanging areas. Preferably, the support material is dissolved with a water-based dissolution in the fifth step. It is herewith advantageously possible to generate overhanging structures, so that complex three-dimensional structure could be printed in dependency of the colored intensity image.

Another subject of the present invention is a method for controlling a print head, in particular of an inkjet printer, for performing a method for printing a three-dimensional structures according to the present invention.

Another subject of the present invention is a printed article comprising a three-dimensional structure printed by a method for printing a three-dimensional structures according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

DETAILED DESCRIPTION

Figure 1:
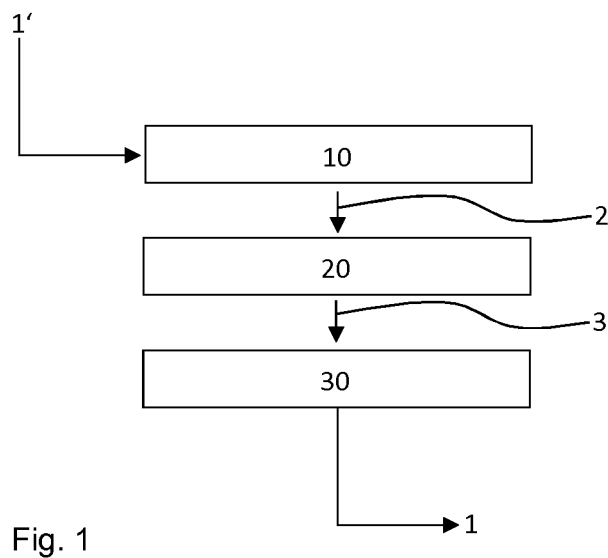
FIG. 1 illustrates schematically different steps of a method for printing a three-dimensional structure according to an exemplary embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1, different individual steps of a method for printing a three-dimensional structure 1 according to an exemplary embodiment of the present invention are schematically shown. In the first step 10, structural parameters 2 of the three-dimensional structure 1 which should be printed are provided. For example, a virtual three-dimensional structure 1' is designed by a user by means of a CAD-software running on a computer. When the design is finished, the CAD-data for the design are provided as the structural parameters 2.

Figure 2:
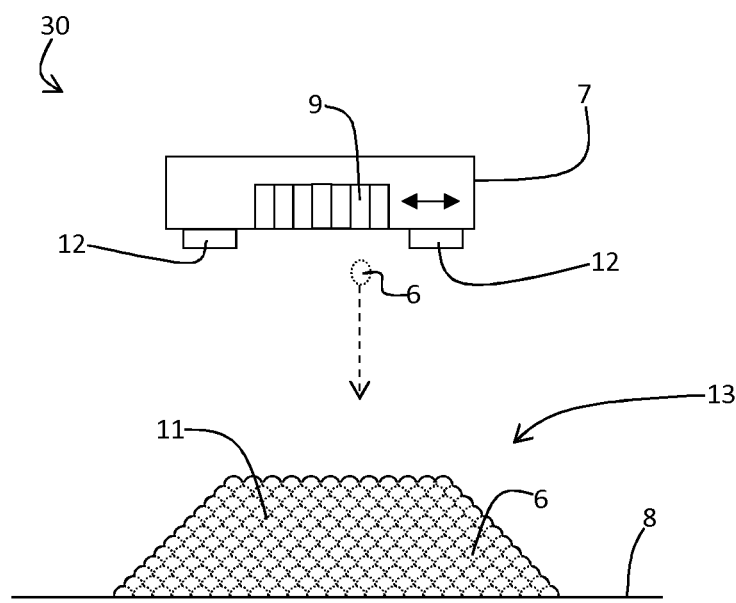
FIG. 2 illustrates a method for printing a three-dimensional structure and a printed article respectively according to the exemplary embodiment of the present invention.

In the subsequent second step 20, the structural parameters 2 are converted into a coloured intensity image 3. The coloured intensity image 3 comprises a two-dimensional pattern 4 of different colour intensities (cp. FIG. 3B). The pattern 4 consists of different pixels 5, wherein each pixel 5 represents a certain position in the virtual three-dimensional structure 1'. In particular, each pixel 5 represents a certain position of a two-dimensional projection 1" of the three-dimensional structure 1' onto a flat base plane 100. On the one hand, the distribution of the intensity in the coloured intensity image 3 represents the shape of the virtual three-dimensional structure 1' as the intensity in each pixel 5 is a value for the height of the three-dimensional structure 1 at the corresponding position. On the other hand, the height of the later printed real three-dimensional structure 1 in a certain position depends on the number of droplets 6 of printing ink and accordingly to the amount of printing material deposited in this position (cp. FIG. 2). If a print head 7 of an inkjet printer deposits printing ink in dependency of the coloured intensity image 3, a three-dimensional structure 1 is printed having the shape of the software based-virtual design. Consequently, the colour intensities of the pixels 5 of the coloured intensity image 3 provide a simple and efficient way to describe the shape of the virtual three-dimensional structure 1' to be printed and gives a printer a distinct information how to deposit printing material in order to built a real three-dimensional structure 1 which corresponds to the designed virtual three-dimensional structure 1'.

As already explained, the generated coloured intensity image 3 is transferred to a printer, preferably an inkjet printer which deposits printing material, like UV curable liquid monomer onto a substrate 8, wherein the monomer becomes a polymer by curing. In a third step 30, the print head 7 of the printer processes the intensity image 3 in such a manner that the print head 7 moves to positions which correspond to the pixels in the intensity image 3 and deposits a certain amount of printing material in the individual positions. Thereby, the print head 7 deposits a number of droplets 6 and accordingly an amount of printing material by means of ejection nozzles 9 in dependency of the intensities in the intensity image 3 in such a manner that at least in the end of the printing process the amount of printing material deposited in each position corresponds to the colour intensity in the pixels. When this condition is fulfilled, the shape of the actual three-dimensional structure 1 printed by the printer is substantially equal to the shape of the virtual three-dimensional structure 1' designed e.g. in the CAD-software.

In FIG. 2 a method for printing a three-dimensional structure 1 and a printed article 13 respectively according to the exemplary embodiment of the present invention is shown in a more illustrative way. It could be seen from FIG. 2 that a plurality of droplets 6 of printing ink are deposited onto the substrate 8 by means of the print head 7 in order to build up the three-dimensional structure 1. The droplets 6 are deposited side by side and one above the other, as indicated by the dashed lines 11, in order to generate the three-dimensional form. The printing ink comprises a UV curable liquid polymer or monomer with a certain viscosity. The print head 7 moves over the substrate 8 and ejects the droplets 6 of printing ink by means of ejecting nozzles 9 to deposit the individual droplets 6 in a certain pattern. After deposition of the droplets 6, adjacent deposited droplets 6 merge which each other (the lower droplets 6 are therefore illustrated only schematically by the dashed lines 11) and are subsequently cured by UV-light emitted by LED's (light emitting diodes) 12 of the print head 7. The printed three-dimensional structure 1 and/or the assembly made of the substrate 8 and the three-dimensional structure 1 printed onto the substrate 8 is also referred to as the printed article 13. In particular, FIG. 2 illustrates mainly the third step 30 of the method according to the present invention.

Preferably, the intensity image 3 contains further information about the three-dimensional structure 1 to be printed, wherein the colour of each pixel 5 represents the further information. It is e.g. conceivable that the print head 7 is capable of ejecting droplets 6 of different printing material, wherein the printing material deposited on a certain position depends on the colour of the corresponding pixel 5 in the coloured intensity image 5. The colour "blue" represents a first printing material and the colour "yellow" represents a second printing material, wherein the intensity of the "blue" defines the amount of first printing material to be deposited and the intensity of the "yellow" defines the amount of second printing material to be deposited, for instance. Preferably, a "green" pixel defines a position of the structure 1, in which both first printing material and second printing material are deposited and therefore mixed with each other. The mixing ratio of the first and the second printing material depends on the mixture of the colours "blue" and "yellow", the colour tone of the "green", wherein the intensity of the "green" defines the height again. Alternatively, it is also conceivable that the pixel colour defines the curing time for curing the deposited droplets 6 in the corresponding position of the printed three-dimensional structure 1. and/or that the pixel colour defines the kind of UV light to be used for curing the deposited droplets 6 in the corresponding position of the printed three-dimensional structure 1.

Figure 3A:
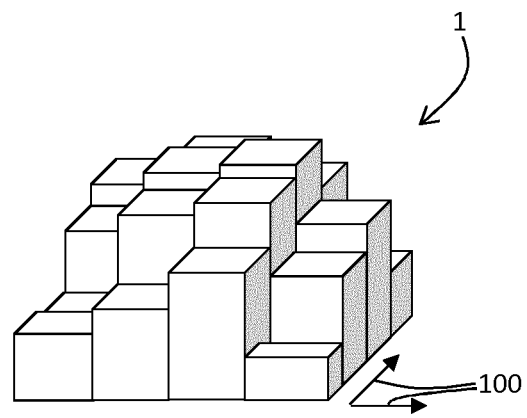
FIGS. 3A and 3B show illustratively a three-dimensional structure and printed article printed by the method for printing a three-dimensional structure, as well as an intensity image used in the method for printing a three-dimensional structure respectively according to the exemplary embodiment of the present invention.
Figure 3B:
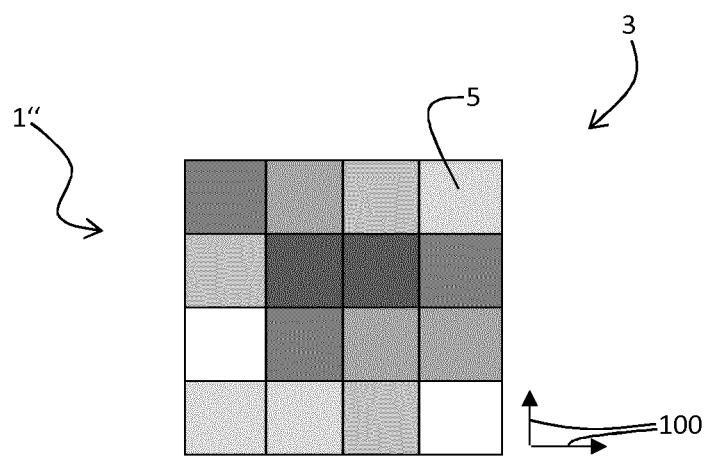

In FIGS. 3A and 3B a three-dimensional structure 1 and printed article 13 printed by the method for printing a three-dimensional structure 1, as well as an intensity image 3 used in the method for printing a three-dimensional structure 1 respectively according to the exemplary embodiment of the present invention is schematically shown. It could be seen that the pattern of the printed three-dimensional structure 1' substantially corresponds to the pixel pattern of the coloured intensity image 3. It goes without saying that the illustration of the printed three-dimensional structure 3 is very simplified. Nevertheless, it could be seen from a comparison between the printed structure 1 shown in FIG. 3A and the intensity image 3 shown in FIG. 3B that the height of the printed three-dimensional structure 1 in each position corresponds to the colour intensity of the corresponding pixel 5 in the intensity image 3.

REFERENCE SIGNS 1 three-dimensional structure
1' virtual three-dimensional structure
1" projection
2 structural parameters
3 intensity image
4 two-dimensional pattern
5 pixel
6 droplet
7 print head
8 substrate
9 ejection nozzle
10 first step
11 dashed lines
12 light emitting diode
13 printed article
20 second step
30 third step
100 base plane

The invention claimed is:

1. A method for printing a three-dimensional structure comprising the following steps:
   1) providing structural parameters defining a shape of the three-dimensional structure in a first step;
   2) converting the structural parameters into a single intensity image having multiple pixels which are arranged in a two-dimensional pattern and which comprises at least different intensities in a second step;
      wherein the structural parameters are converted into a colored intensity image having multiple pixels which comprises different colors in the second step,
      wherein the structural parameters are converted into the colored intensity image in the second step in such a manner that each pixel represents a certain position in an orthogonal projection of the three-dimensional structure,
      wherein a color of each pixel represents geometrical, optical and/or visual characteristics of the three-dimensional structure at this position,
      wherein an intensity of each pixel represents a height of the three-dimensional structure at this position;
   3) controlling a print head in dependency of the intensity image in order to print the three-dimensional structure in a third step,
      wherein the print head moves to a certain position and deposits at least one droplet of printing material when processing a certain pixel,
      wherein a number of droplets and/or an amount of printing material deposited at the certain position by the print head is chosen in dependency of the intensity of the corresponding pixel.

2. The method according to claim 1, wherein the structural parameters are converted into a colored intensity image having multiple pixels which comprises different colors in the second step, and
   wherein the print head is controlled in dependency of the colored intensity image in order to print the three-dimensional structure in the third step, and
   wherein a type of printing material deposited at the certain position by the print head is chosen in dependency of the color of the corresponding pixel.

3. The method according to claim 1, wherein the structural parameters are provided as CAD-data in the first step.

4. The method according to claim 1, wherein the structural parameters are converted into the colored intensity image in the second step in such a manner that a certain color of a pixel represents a certain kind of UV light to be used for curing the droplets deposited at the corresponding position, wherein the print head deposits droplets of printing material at a certain position in the third step, and wherein a light source cures the deposited droplet when the corresponding pixel comprises a color representing the kind of UV light emitted by the light source.

5. The method according to claim 4, wherein the color represents a certain wavelength spectrum of the UV light and the light source cures the deposited droplet with light of a certain wavelength spectrum when the corresponding pixel comprises a color representing this wavelength spectrum.

6. The method according to claim 1, wherein the structural parameters are converted into the colored intensity image in the second step in such a manner that another certain color of a pixel represents a finishing material,
wherein the method comprises a fourth step, in which the print head deposits droplets of the finishing material at a certain position onto the three-dimensional structure printed in the third step when the corresponding pixel comprises a color representing a finishing layer.

7. The method according to claim 1, wherein the structural parameters are converted into the colored intensity image in the second step in such a manner that a certain color of a pixel represents a support material for providing overhanging areas in the three-dimensional structure,
wherein the print head deposits droplets of the support material at a certain position in the third step when the corresponding pixel comprises a color representing a support material layer, and
wherein the method comprises a fifth step, in which the deposited support material is removed to generate the overhanging areas.

8. The method according to claim 7, wherein the support material is dissolved with a water-based dissolution in the fifth step.

9. The method according to claim 2, wherein the structural parameters are provided as CAD-data in the first step.

10. The method according to claim 2, wherein the structural parameters are converted into the colored intensity image in the second step in such a manner that a certain color of a pixel represents a certain kind of UV light to be used for curing the droplets deposited at the corresponding position,
wherein the print head deposits droplets of printing material at a certain position in the third step, and
wherein a light source cures the deposited droplet when the corresponding pixel comprises a color representing the kind of UV light emitted by the light source.

11. The method according to claim 3, wherein the structural parameters are converted into the colored intensity image in the second step in such a manner that a certain color of a pixel represents a certain kind of UV light to be used for curing the droplets deposited at the corresponding position,
wherein the print head deposits droplets of printing material at a certain position in the third step, and
wherein a light source cures the deposited droplet when the corresponding pixel comprises a color representing the kind of UV light emitted by the light source.

12. The method according to claim 2, wherein the structural parameters are converted into the colored intensity image in the second step in such a manner that another certain color of a pixel represents a finishing material,
wherein the method comprises a fourth step, in which the print head deposits droplets of the finishing material at a certain position onto the three-dimensional structure printed in the third step when the corresponding pixel comprises a color representing a finishing layer.

13. The method according to claim 5, wherein the structural parameters are converted into the colored intensity image in the second step in such a manner that another certain color of a pixel represents a finishing material,
wherein the method comprises a fourth step, in which the print head deposits droplets of the finishing material at a certain position onto the three-dimensional structure printed in the third step when the corresponding pixel comprises a color representing a finishing layer.

14. The method according to claim 11, wherein the structural parameters are converted into the colored intensity image in the second step in such a manner that another certain color of a pixel represents a finishing material,
wherein the method comprises a fourth step, in which the print head deposits droplets of the finishing material at a certain position onto the three-dimensional structure printed in the third step when the corresponding pixel comprises a color representing a finishing layer.

15. The method according to claim 2, wherein the structural parameters are converted into the colored intensity image in the second step in such a manner that a certain color of a pixel represents a support material for providing overhanging areas in the three-dimensional structure,
wherein the print head deposits droplets of the support material at a certain position in the third step when the corresponding pixel comprises a color representing a support material layer, and wherein the method comprises a fifth step, in which the deposited support material is removed to generate the overhanging areas.

16. The method according to claim 14, wherein the structural parameters are converted into the colored intensity image in the second step in such a manner that a certain color of a pixel represents a support material for providing overhanging areas in the three-dimensional structure,
wherein the print head deposits droplets of the support material at a certain position in the third step when the corresponding pixel comprises a color representing a support material layer, and
wherein the method comprises a fifth step, in which the deposited support material is removed to generate the overhanging areas.

17. The method according to claim 16, wherein the support material is dissolved with a water-based dissolution in the fifth step.

* * * * *